March 9, 1943. J. A. McGREW 2,313,658
LOCK WASHER
Filed April 29, 1942 2 Sheets-Sheet 1

Inventor
John A. McGrew
By Watson, Cole, Grindle & Watson
Attorney

March 9, 1943. J. A. McGREW 2,313,658
LOCK WASHER
Filed April 29, 1942 2 Sheets-Sheet 2
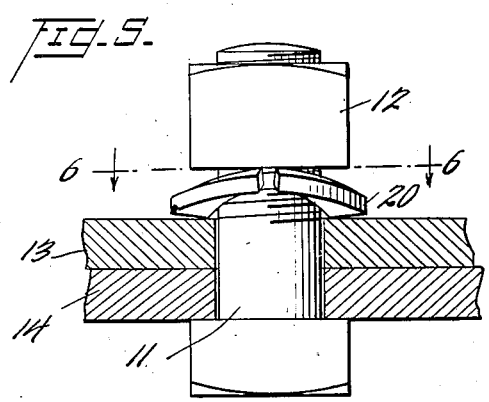
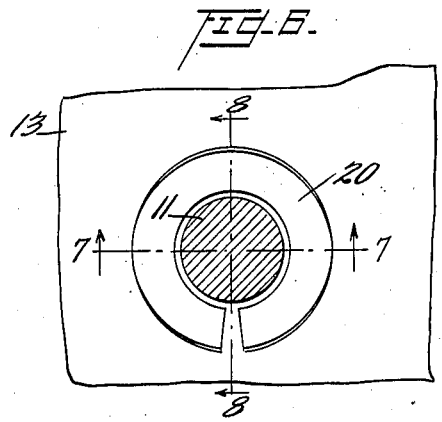
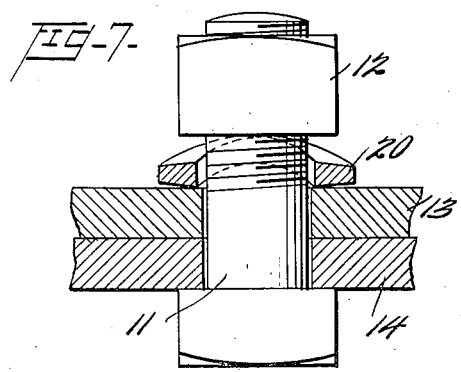
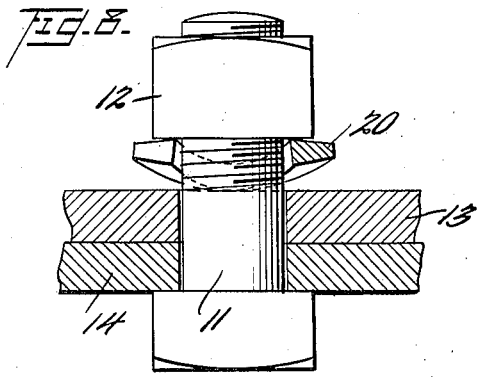
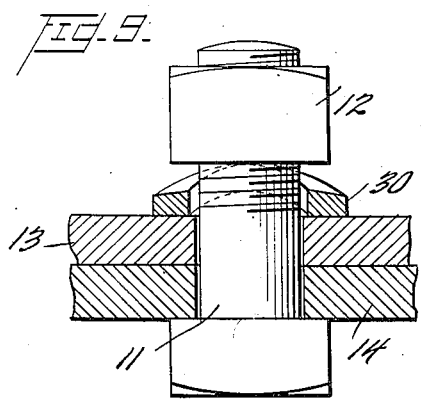
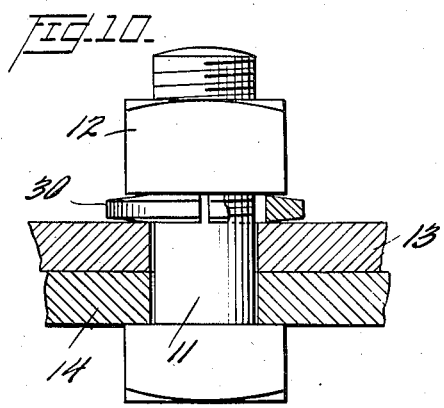
Inventor
John A. McGrew
By Watson, Cole, Grindle & Watson
Attorney Patented Mar. 9, 1943

2,313,658

UNITED STATES PATENT OFFICE 2,313,658

LOCK WASHER

John A. McGrew, Albany, N. Y.

Application April 29, 1942, Serial No. 441,005

3 Claims. (Cl. 151—36)

The present invention relates to lock washers and particularly to lock washers of the type disclosed and claimed in Letters Patent No. 2,235,233, issued to me March 18, 1941.

The lock washer which comprises the subject matter of the Letters Patent just above identified is reversible and comprises a one-piece nearly continuous ring-like member adapted to closely encircle a bolt. It may be said to comprise two similar deformable or resilient portions oppositely curved about a common axis, two adjacent ends of these deformable portions merging with each other and the other two adjacent ends being free and separated by a narrow gap, both such portions being likewise curved or arched continuously from their free ends to their merged ends about a common axis spaced laterally of the washer. Its shape is such that the washer will have three points of contact with either of two parallel surfaces to be locked together against relative rotation, and two points of contact with the second of such parallel surfaces. The lock or spring washer disclosed in my prior patent is thus of extremely simple nature, may be fabricated at low cost, is easily stored, transported and applied, is reversible, and has a very great resistance to loading in proportion to its weight and size. By reason of the fact that the washer of my prior patent comprises two deformable or resilient portions of equal strength, instead of one only as does the helical washer, it will resist loading, for a given weight of metal, with almost twice the resistance of a helical washer, the helical washer comprising a single deformable member only, and is extremely well adapted to be used as a resilient locking member. Being annular and adapted to closely encircle the bolt, it is particularly well adapted to serve as a means for preventing the backing off of a securing nut which has been threaded upon a bolt. When so applied it will have three points of contact either with the inner face of the nut or with the parallel face of the stationary member, and will have two points of contact with the opposed face.

While generally acceptable and capable of accomplishing the functions of a lock washer for all purposes, my prior washer, however, may under certain circumstances tend to expand or spread slightly when being loaded or tensioned and this occurs particularly when the washer is made use of in association with a bolt of relatively large diameter upon which is threaded a nut of relatively small diameter. Under such circumstances the smallest diameter across the nut may be substantially less than the diameter across the outer periphery of the washer, the washer projecting outwardly beyond the edge of the nut. Rapid tightening of the nut when such a condition as this obtains, occasionally causes the objectionable spreading or separation of the free ends of the washer above mentioned. It is the purpose of the present invention to provide an improved type of washer which, while retaining all of the numerous advantages of the washer disclosed and claimed in my patent previously referred to, is nevertheless so designed and constructed that spreading or separation of the ends of the washer when it is being loaded, cannot occur. Preferably this desirable result is realized by so modifying the construction of the washer that contact between the washer and both of the parallel surfaces between which it is placed is had along the inner periphery of the washer. While all five points of contact of the washer and the members between which it is placed are preferably at the inner periphery of the washer, in any event the free ends of the washer are so shaped that the contact which each of these ends makes, with one of the parallel surfaces between which the washer is placed, is at the inner periphery of the washer instead of outwardly toward or at its outer periphery. Preferably also the third point of contact with that surface which is engaged by the washer free ends is also at the inner periphery of the washer. Conveniently but not necessarily, the two points of contact between the washer and the second of the parallel surfaces between which it is placed may be at the inner periphery of the washer. In any event, and whichever modified form of washer may be chosen for use, the difficulty of spreading heretofore met with is eliminated. In the accompanying drawings several forms of washers constructed in accordance with the invention are illustrated and it will be understood by those skilled in the art that these embodiments are set forth by way of example only and that still other forms may be evolved in adapting the invention to special applications.

In the drawings:

Figure 5 is a view similar to Figure 1, showing intermediate the nut and adjacent member a lock washer of modified type;

Figure 6 is a section on line 6—6 of Figure 5;

Figure 7 is a section on line 7—7 of Figure 6;

Figure 8 is a section on line 8—8 of Figure 6;

Figure 9 is a view generally similar to Figure 7 but showing a third form of lock washer; and Figure 10 is a similar view, showing the lock washer of Figure 9 completely loaded, or reduced to solid height.

Figure 1:
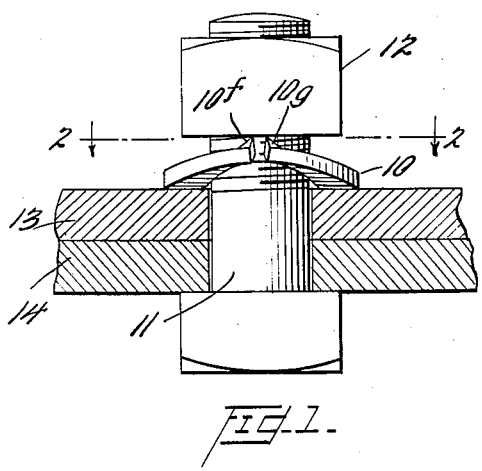
Figure 1 shows in side elevation a bolt, two members to be secured together face to face, a nut threaded on the bolt, and, between the nut and one of said members, a lock washer constructed in accordance with the invention.
Figure 2:
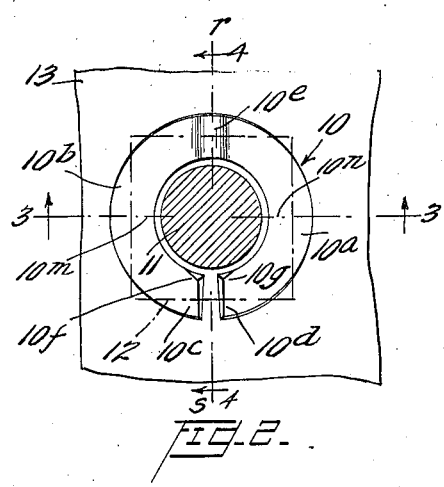
Figure 2 is a section on line 2—2 of Figure 1.
Figure 3:
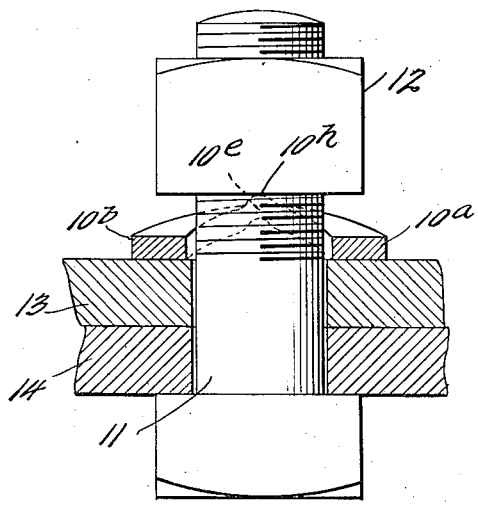
Figure 3 is a section on line 3—3 of Figure 2.
Figure 4:
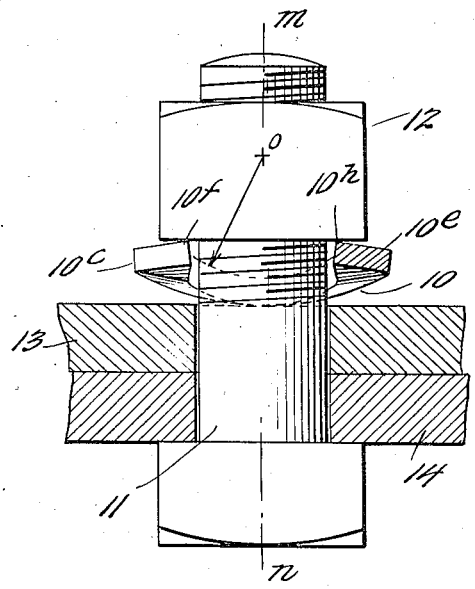
Figure 4 is a section on line 4—4 of Figure 2.

The lock washer shown in Figures 1-4 is generally indicated at 10, the bolt which it encircles at 11, a nut threaded on the bolt at 12, and members, such for instance as flat metallic plates to be bolted together, at 13 and 14 respectively. The bolt and associated nut are of conventional type and the nut may be of any size or type. As the improved washer is particularly suitable for use in any case where its outer diameter is greater than the smallest distance across the nut, a nut of small size is shown, the distance between the parallel faces of which is considerably less than the diameter across the outer periphery of the washer. It will be understood, however, that the washer may be freely used with nuts the smallest dimensions of which are equal to or greater than the diameter across the outer periphery of the washer.

As previously stated, the washer may be said to comprise two similar portions, each approximately semi-circular, one portion being indicated at 10a and the other at 10b, these portions having similar free ends 10c and 10d, closely adjacent or separated only by a narrow gap, the opposite ends of portions 10a and 10b merging at 10e so that the washer comprises one integral member which may be described as a one-piece nearly continuous ring-like member adapted to closely encircle the bolt. Members 10a and 10b are oppositely and circularly curved about a common axis which is indicated by the line m—n in Figure 4 of the drawings, this axis being coincident with the axis of the bolt when the washer is applied in the manner illustrated, and the members 10a and 10b are also arched about an axis normal to the plane of the paper and passing through the point O, also indicated in Figure 4, the point O being located upon the previously mentioned axis m—n. Hence the washer is circularly curved about one axis and is arched about a second axis intersecting the first, this second axis being normal to a plane which includes the first axis and also passes between the adjacent free ends 10c and 10d of the washer. In other words, the washer will be circularly curved about the axis m—n and arched about an axis passing through the line m—n and normal to a plane which includes the axis m—n and the line r—s shown in Figure 2.

As shown clearly in Figures 1–4 the washer is distorted at its mid-point 10e and at its ends 10c and 10d so that it is not, in effect, continuously arched for the length of its outer diameter in the plane r—s, the free ends being twisted or upset to insure that the points of contact between these free ends, one of which points is indicated at 10f and the other at 10g, between the washer and the adjacent surface of the nut or the adjacent surface of member 13, are at the inner periphery of the washer rather than at the outer periphery. Likewise the washer is preferably distorted at its mid-point 10e so as to provide a point of contact 10h at its inner periphery, as clearly shown in Figure 4. Quite clearly, when the washer closely encircles a bolt, as is intended, and the points of contact on the concave side of the washer are disposed as shown in Figures 1–4, such points of contact will have bearing against the under-face of any nut which may be placed upon the bolt. It is also quite apparent that, if the washer be reversed, the three projections 10f, 10g and 10h will engage the face of member 13 and that the convex side of the washer will have line or point contact at 10m and 10n with the inner face of the nut. The spring washer is entirely operative in either position.

In Figures 5–8, inclusive, a form of washer, indicated at 20, is illustrated which is of constant radial section throughout, being appreciably thicker at its inner periphery than at its outer periphery. By reason of the increased thickness of the washer at its inner periphery the three points of initial contact between the washer and the inner surface of a nut will be at the inner periphery of the washer and the two points or lines of contact between the opposite or convex side of the washer and the second surface will also be at the inner periphery of the washer. As the nut is tightened, continuous contact is thus maintained between all bearing points of the washer and the parallel surfaces between which it is placed, and no spreading of the ends will occur. A similar result can be obtained with the washer indicated at 30 and having the section shown in Figures 9 and 10. Here the washer is tapered in a manner which is slightly different from that in which the washer of Figures 5–8 is tapered, one face of the washer of Figures 9 and 10 being normally at right angles to its circular inner surface (considering a radial section), whereas in the washer of Figures 5–8 both faces are inclined to the inner cylindrical surface of the washer (also in radial section). The general effect is the same, however, and when the washer is reduced to its solid height, or is fully loaded, as shown in Figure 10, contact between the washer and each of the parallel surfaces between which it is placed will be at the inner periphery of the washer. Still other forms of washers may be devised in adapting the invention to special circumstances.

Having thus described the invention, what is claimed as new and desired to be secured by Letters Patent is:

1. A reversible spring washer comprising two similar deformable portions circularly curved about an axis and arranged in end-to-end relationship, two adjacent ends of said portions being free or independent of each other and separated by a narrow gap and the other two ends merging at a junction point midway between said free ends so that the two curved portions together form a one-piece nearly continuous ring-like member adapted to closely encircle a bolt, each such portion being also curved or arched from its free end to its merged end about an axis spaced laterally of the washer, and which passes through or near said first mentioned axis, said last mentioned axis being substantially normal to a plane which includes the first mentioned axis and passes through the gap between the free ends of said deformable portions, whereby the free end and merged end of each deformable portion of said washer will contact with one of two parallel surfaces and a point on each deformable portion intermediate its free and merged ends will contact with the second of such parallel surfaces when the washer is partially loaded, the washer being so formed at its ends and midpoint that it will initially contact with one of such parallel surfaces at three points all of which will be along the inner periphery of the washer, and will contact with the second of said surfaces at two points.

2. A reversible spring washer comprising two similar deformable portions circularly curved about an axis and arranged in end-to-end relationship, two adjacent ends of said portions being free or independent of each other and separated by a narrow gap and the other two ends merging at a junction point midway between said free ends so that the two curved portions together form a one-piece nearly continuous ring-like member adapted to closely encircle a bolt, each such portion being also curved or arched from its free end to its merged end about an axis spaced laterally of the washer, and which passes through or near said first mentioned axis, said last mentioned axis being substantially normal to a plane which includes the first mentioned axis and passes through the gap between the free ends of said deformable portions, whereby the free end and merged end of each deformable portion of said washer will contact with one of two parallel surfaces and a point on each deformable portion intermediate its free and merged ends will contact with the second of such parallel surfaces when the washer is partially loaded, the said washer tapering outwardly in radial section from its inner periphery to its outer periphery so that all of the three points of initial contact between the same and one of said surfaces will be along the inner periphery of the washer, the washer being adapted to have two points of contact with the other of said surfaces.

3. A reversible spring washer comprising two similar deformable portions circularly curved about an axis and arranged in end-to-end relationship, two adjacent ends of said portions being free or independent of each other and separated by a narrow gap and the other two ends merging at a junction point midway between said free ends so that the two curved portions together form a one-piece nearly continuous ring-like member adapted to closely encircle a bolt, each such portion being also curved or arched from its free end to its merged end about an axis spaced laterally of the washer, and which passes through or near said first mentioned axis, said last mentioned axis being substantially normal to a plane which includes the first mentioned axis and passes through the gap between the free ends of said deformable portions, whereby the free end and merged end of each deformable portion of said washer will contact with one of two parallel surfaces and a point on each deformable portion intermediate its free and merged ends will contact with the second of such parallel surfaces when the washer is partially loaded, the said washer, at its inner periphery, being thicker than at its outer periphery or intermediate its inner and outer peripheries so that all of the three points of initial contact between the washer and one of said surfaces will be along the inner periphery of the washer, the washer being adapted to have two points of contact with the other of said surfaces.

JOHN A. McGREW.